Figure 1:
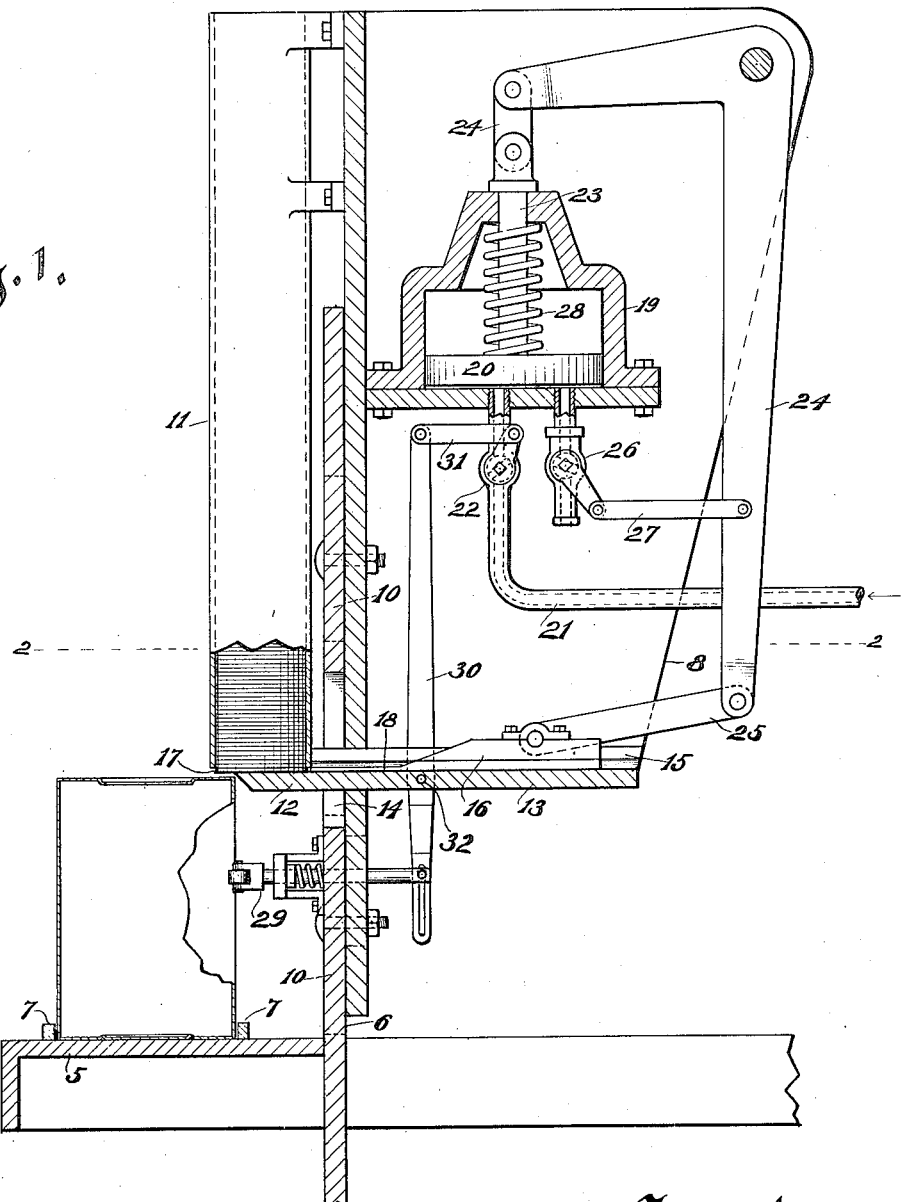

J. B. WHITE & F. WHEELER.
MACHINE FOR FEEDING CAN TOPS.
APPLICATION FILED JULY 22, 1907.

934,586.

Patented Sept. 21, 1909.
2 SHEETS—SHEET 1.

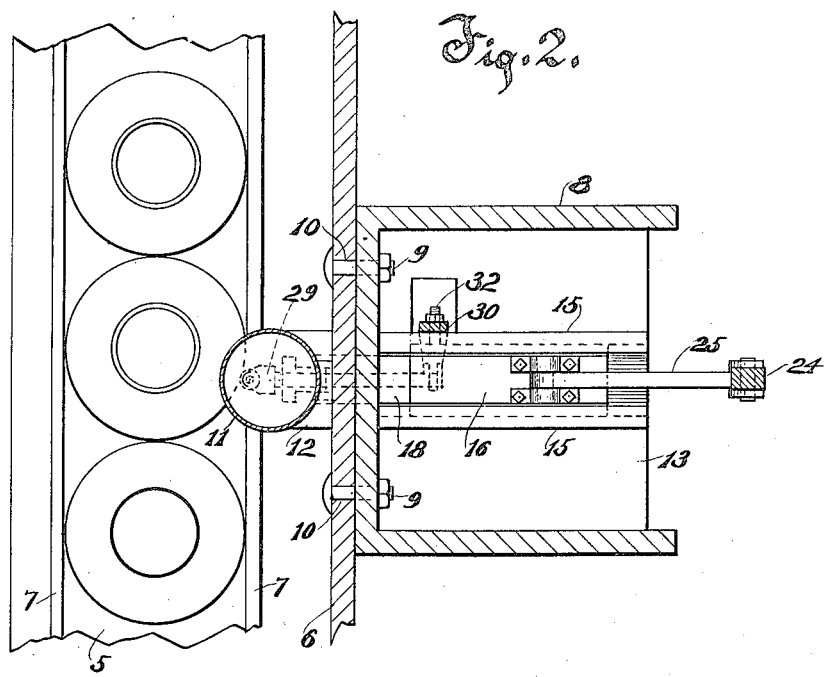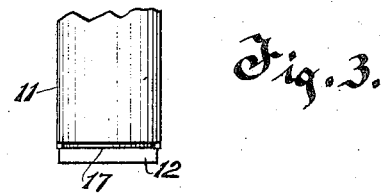

UNITED STATES PATENT OFFICE.

JOHN B. WHITE AND FRANK WHEELER, OF APPLETON, WISCONSIN.

MACHINE FOR FEEDING CAN-TOPS.

934,586. Specification of Letters Patent. Patented Sept. 21, 1909.

Application filed July 22, 1907. Serial No. 384,995.

*To all whom it may concern:*

Be it known that we, JOHN B. WHITE and FRANK WHEELER, both residing in Appleton, in the county of Outagamie and State of Wisconsin, have invented new and useful Improvements in Machines for Feeding Can-Tops, of which the following is a description, reference being had to the accompanying drawings, which are a part of this specification.

Our invention has relation to improvements in machines for feeding can tops, and has for its object to provide means for feeding tops or covers to cans used for preserving fruits, vegetables, meats, etc., preparatory to soldering and sealing the caps to said cans.

The invention consists in providing a supply receptacle for holding can tops in proper position and adjacent to the line of travel of cans on a filling and soldering machine. As the cans are moved by the receptacle each one will engage operatively a spring-actuated rod which will open a valve controlling a fluid under pressure, and admit the same to a motor which in turn will operate mechanism to move a can top from the can top receptacle to the proper position on the can for soldering, and the same movement of the mechanism will open an exhaust valve to the motor and permit a spring to return the moving parts of the motor to their initial positions, the can in the meantime having passed the spring-actuated arm, the spring will move said arm and close the valve controlling the fluid under pressure. The parts will then be in position to be again operated by the next succeeding can. The device is made adjustable in order to feed tops to cans of different sizes.

With the above, and other incidental objects in view, the invention consists of the devices and parts, or their equivalents, as hereinafter described.

In the accompanying drawings, Figure 1 is a cross sectional view of a fragment of a can filling and soldering machine with our improved device for feeding can tops attached thereto, parts of the device being in section; Fig. 2 is a sectional view thereof taken on line 2—2 of Fig. 1; and Fig. 3 is a fragment of the can top receptacle showing the outlet opening for the can tops.

Referring to the drawings the numeral 5 indicates the main frame of the can filling and soldering machine, and 6 is a vertical portion of the frame thereof. The cans are moved along on top of the main frame 5 of the machine between the guide strips 7, 7 in any desirable manner. A frame 8 channel shaped in cross section is adjustably secured to the vertical portion of the frame of the machine by suitable bolts 9, 9 passing through slotted openings 10, 10 in the vertical frame and openings in the channel frame, the slots permitting the vertical adjustment of the channel frame and the attached mechanism. A can top receptacle 11 is secured to the upper portion of the channel frame and depends therefrom and in front of the vertical portion of the main frame, and its lower end rests upon a forward extension 12 of the bottom plate 13 of the channel frame. The extension 12 passes through a slot 14 in the vertical portion of the main frame thus permitting this portion to be raised or lowered with the channel frame in adjusting the device for cans of different sizes.

The bottom plate 13 is provided with guide-ways 15 adapted to guide a pusher block 16 in its reciprocations in pushing out the can tops from the can top receptacle.

The lower forward portion of the receptacle is provided with an opening 17 of sufficient size to allow but one can top to be pushed therethrough at a time. The pusher block is provided with a thin forwardly projecting portion 18 which is adapted to engage one of the can tops through an opening in the lower rear portion of the can top receptacle, the lower end of the said receptacle being so positioned with relation to the moving cans that when one of the can tops is discharged from the receptacle it will drop into the recess or depression formed on top of the can and cover the opening and rest in proper position for soldering. A cylinder 19 provided with a piston 20 is connected to the channel frame between the side portions thereof, and this piston is adapted to be forced upwardly by means of a fluid under pressure admitted to the cylinder through a supply pipe 21 provided with valve 22 adapted to control the admission of a fluid under pressure to the cylinder. A piston rod 23 connected to the piston 20 extends through the upper end of the cylinder and is connected to a bell-crank lever 24 by means of a link connection pivotally connected to the bell-crank and the piston rod. A link 25 connects the lower end of the bell-crank lever to the pusher block 16 so that when fluid under pressure is admitted to the cylinder the piston will be forced upwardly. This movement will swing the short arm of the bell crank lever upwardly and the long arm inwardly, and move the pusher-block toward the can top receptacle and push out a can top therefrom and onto the can moving in front of the receptacle. An exhaust valve 26 is connected to the cylinder 19 and is adapted to allow the fluid under pressure to exhaust therethrough, when the bell-crank lever has been moved to a position at the end of its movement in forcing out one of the can tops, by means of a link 27 connected to the depending arm of the bell-crank lever and the stem of the valve.

The piston and connected mechanism are returned to their initial positions by means of a coiled spring 28 interposed between the cylinder top and the piston, and the exhaust valve is closed at the same time by the return movement of the bell-crank lever.

A spring-pressed rod 29 provided with an anti-friction roller on its end extends into the path of movement of the cans to be capped and is adapted to be forced inwardly by each can that passes by the can top receptacle. This rod is provided with proper bearings connected to the vertical part of the can machine frame, and extends through a slot in the channel frame and is connected to the slotted end of a pivoted lever 30, the said lever at its upper end being connected to the stem of the inlet valve 22 by means of a link 31. The lever 30 is pivoted to the channel frame by means of a pivot pin 32. The coiled spring on the rod 29 is adapted to force said rod outwardly after a can has passed out of engagement therewith, and close the inlet valve as soon as a can top has been fed to the can in front of the can top receptacle. By means of the slot in the channel frame and the slot in the lower end of the pivoted lever 30 provision is made for allowing the channel frame to be raised and lowered without changing the position of the spring pressed rod 29.

In operation cans are placed on top of the main frame between the guide strips and are moved along by any desirable means, and as they approach a position near the can top receptacle each can in turn will press the spring-actuated rod inwardly. This movement by means of the connected mechanism will open the inlet valve to the cylinder and admit fluid under pressure thereto and force up the piston, and by means of the bell-crank lever and connected links will force the pusher block toward the can top receptacle, and the forwardly projecting portion thereof will engage the lowest can top within the receptacle and force the same therefrom and drop it in proper position on top of the can. As soon as the bell-crank lever has been moved to the end of its movement in forcing out a can top, it will have opened the exhaust valve to the cylinder and allow the fluid under pressure therein to discharge therefrom and the mechanism to return to its normal position. Simultaneously with the opening of the exhaust valve, the inlet valve will have been closed by reason of the can having passed out of engagement with the spring actuated rod, and said rod will be forced outwardly by means of the spring and close said inlet valve. The operation will be repeated each time a can engages the spring-actuated rod.

It is to be understood that the details of construction may be changed materially without departing from the spirit and scope of the invention.

What we claim as our invention is:

1. In a machine for feeding can tops, the combination of a member controlling a fluid under pressure and positioned operatively in the path of movement of cans to be capped, and mechanism operated by the fluid under pressure adapted to feed a can top to a can each time the said member is moved by a can.

2. In a machine for feeding can tops, the combination of a member controlling a fluid under pressure and positioned operatively in the path of movement of cans to be capped, a can top receptacle adjacent to said cans, and mechanism operated by the fluid under pressure adapted to move out a can top from the receptacle on to a can each time the said member is moved by a can.

3. In a machine for feeding can tops, the combination of a member controlling a fluid under pressure and positioned operatively in the path of movement of cans to be capped, a can top receptacle adjacent to said cans, means for discharging can tops from said receptacle, and mechanism operated by the fluid under pressure adapted to operate the can top discharging means to feed a can top to a can each time the said member is moved by a can.

4. In a machine for feeding can tops, the combination of a member controlling a fluid under pressure and positioned operatively in the path of movement of cans to be capped, a can top receptacle adjacent to said cans, means for discharging can tops from said receptacle, and a motor operated by the fluid under pressure for actuating the discharging means to feed a can top to a can each time the said member is moved by a can.

5. In a machine for feeding can tops, the combination of a cylinder, a piston within said cylinder, a can top receptacle adjacent to the path of movement of cans to be capped, a bell-crank lever operatively connected to the piston, a pusher block for discharging can tops from said receptacle operatively connected to the bell-crank lever, inlet and outlet valves connected to the cylinder, a connection between the outlet valve and the bell-crank lever, and a spring actuated member positioned in the path of movement of the cans for controlling the inlet valve to admit a fluid under pressure to the cylinder.

6. In a machine for feeding can tops, the combination of a cylinder, a piston within said cylinder, a can top receptacle adjacent to the path of movement of cans to be capped, a bell-crank lever operatively connected to the piston, a pusher block for discharging can tops from said receptacle operatively connected to the bell-crank lever, inlet and outlet valves connected to the cylinder, a connection between the outlet valve and the bell-crank lever, a pivoted lever connected to the inlet valve, and a spring-actuated member positioned in the path of movement of the cans connected to said lever to control the admission of a fluid under pressure to the cylinder.

7. In a machine for feeding can tops, the combination of a cylinder, a piston within said cylinder, a can top receptacle adjacent to the path of movement of cans to be capped, a bell-crank lever operatively connected to the piston, a pusher block for discharging can tops from said receptacle operatively connected to the bell-crank lever, inlet and outlet valves connected to the cylinder, a connection between the outlet valve and the bell-crank lever, a pivoted lever provided with a slot connected to the inlet valve, and a spring-actuated rod, one end of which is positioned in the path of movement of the cans, connected to the slotted portion of the said lever to control the admission of a fluid under pressure to the cylinder.

8. In a machine for feeding can tops, the combination of a frame adjustably connected to a machine for moving cans, a cylinder connected to said frame, a piston within said cylinder, a can top receptacle connected to said frame and adjacent to the path of movement of said cans, a piston rod connected to said piston, a coiled spring surrounding said piston rod and interposed between the piston and one end of the cylinder, a link connected to the piston rod, a bell-crank lever pivoted to the frame and connected to the link, a pusher block for discharging can tops from said receptacle slidably mounted on said frame, a link pivotally connected to the pusher block and the bell-crank lever, inlet and outlet valves for controlling the admission and discharge of a fluid under pressure to and from the cylinder, a link connection between the outlet valve and the bell-crank lever, a lever provided with a slot and pivoted to the frame, a link connection between the inlet valve and the lever, and a spring-returned sliding rod, one end of which is positioned in the path of movement of the cans, connected to the slotted portion of said lever to control the admission of the fluid under pressure to the cylinder.

In testimony whereof, we affix our signatures, in presence of two witnesses.

JOHN B. WHITE.
FRANK WHEELER.

Witnesses:
J. E. LEHR,
DANIEL P. STEINBERG.